July 6, 1937.                N. M. STANLEY                2,086,286
                     SYNTHETIC RESIN MAGNIFYING GLASS
                           Filed Sept. 14, 1935
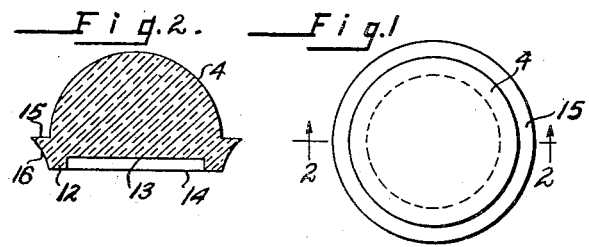
INVENTOR
NATHAN M. STANLEY.
BY
ATTORNEYS Patented July 6, 1937

2,086,286

UNITED STATES PATENT OFFICE 2,086,286

SYNTHETIC RESIN MAGNIFYING GLASS

Nathan M. Stanley, Dayton, Ohio

Application September 14, 1935, Serial No. 40,595

2 Claims. (Cl. 88—39)

My invention relates to magnifying lenses.

It is the particular object of my invention to provide a magnifying lens of synthetic materials of such type that it can be moulded and extruded in final form without the necessity of expensive grinding and polishing operations ordinarily required in connection with magnifying glasses made of glass.

It is an object of my invention to provide a novel form of magnifying lens of synthetic materials. The further advantage of a synthetic material is the decrease in weight, the decrease in liability to being chipped and the reduction in cost of manufacture as compared with glass.

It is a further object to provide a novel form of magnifying instrument and a novel form or forms of support therefor.

Referring to the drawing:

Figure 1 is a top plan view of a synthetic magnifying lens having a supporting rim at the bottom for keeping the bottom face away from the material being examined, and having an arcuate finger rest so as to permit of the handling and support of the lens without finger prints and scarring.

Figure 2 is a section on the line 2—2 of Fig. 1.

Various types of synthetic plastic resins may be employed which have optical properties. It is preferable that those employed be cheaper than glass. A typical resin of this character which I have employed is water-white and clear as ordinary crown glass. It does not chip and does not break when dropped. It is exceedingly tough. It is a synthetic resin of the acrolein type derived from coal tar. It is a thermoplastic resin, readily softening at about 248° F. It can be machined, turned, curved and cut, and has a very high tensile strength and a high resistance to water. It is not affected by dilute acids, and is resistant to alkalies and alcohols. It is capable of being cemented. In the trade in Great Britain this resin is known and sold under the trade name of "Resin-M".

Other resins can be used. For instance, urea-formaldehyde condensation products known under the trade names of "Pollopas", "Plastopal" and "Shellan" are understood by me to have the desired optical and transparent properties. Such resins are clear, transparent and colorless, as glass.

Referring to the drawing in detail, the lens may be formed by extruding or moulding or by turning and forming. When moulded, the material comes from the mould with such a high polish that little, if any, additional polishing is necessary.

Figs. 1 and 2 show the use of a ridge or rim 12 formed on the bottom margin of the lens with the bottom of the lens at 13 located above the surface 14 which is being examined by the lens. In this manner the protecting rim 12 prevents the surface 13 from being engaged by the surface 14 and scratched. It also prevents the lens from picking up dust from the surface 14. In many instances it is undesirable to touch the surface 14 with a lens, and by having the rim 12 this disadvantage is avoided.

In Figs. 1 and 2 a relatively large, broad and outwardly-flaring rim is provided, having the arcuate surface 16. This facilitates the lifting and positioning of the lens by the fingers without leaving any finger prints on the lens in the line of vision through the lens.

If desired, supports can be moulded on to or into the synthetic resin lens simultaneously with the formation of the rest of the lens. It will be understood that the supporting rib 12 and the rims 10, 15 and 16 may be formed either integrally or of separate materials.

It will be understood that I desire to comprehend within my invention such modifications as may be necessary to adapt it to varying conditions and uses.

Having thus fully described my invention, what I claim as new and desire to secure by Letters Patent, is:

1. A new article of manufacture for use as a magnifying lens comprising a synthetic resin body with a curved top and a substantially flat bottom, and an integral projecting rim marginally disposed with respect to said bottom, to support the bottom above the object being examined, and a laterally-extending structurally integral rim for the purpose of facilitating the movement of the lens, said rim flaring upwardly and outwardly to fit the fingers of the user.

2. A new article of manufacture for use as a magnifying lens comprising a body of synthetic resin of a coal tar derivative having optical properties with a curved top and a substantially flat bottom, and a projecting rim marginally disposed with respect to said bottom, to support the bottom above the object being examined, and a laterally-extending integral rim for the purpose of facilitating the movement of the lens, said rim flaring upwardly and outwardly to fit the fingers of the user, said rim being formed of the same material.

NATHAN M. STANLEY.